United States Patent
Gupta

(10) Patent No.: US 12,501,291 B2
(45) Date of Patent: Dec. 16, 2025

(54) METHOD AND TEST SYSTEM FOR ESTABLISHING AN OVER-THE-AIR COMMUNICATION CONNECTION BETWEEN A DUT AND A MOBILE COMMUNICATION TESTER

(71) Applicant: Rohde & Schwarz GmbH & Co. KG, Munich (DE)

(72) Inventor: Nalin Gupta, Fleet (GB)

(73) Assignee: Rohde & Schwarz GmbH & Co. KG, Munich (DE)

( * ) Notice: Subject to any disclaimer, the term of this patent is extended or adjusted under 35 U.S.C. 154(b) by 313 days.

(21) Appl. No.: 18/461,892

(22) Filed: Sep. 6, 2023

(65) Prior Publication Data

US 2025/0081005 A1  Mar. 6, 2025

(51) Int. Cl.
*H04W 24/06* (2009.01)
(52) U.S. Cl.
CPC .................................. *H04W 24/06* (2013.01)
(58) Field of Classification Search
CPC ..................................................... H04W 24/06
See application file for complete search history.

(56) References Cited

U.S. PATENT DOCUMENTS

| 2004/0018853 | A1 | 1/2004 | Lewis |
| 2018/0049051 | A1* | 2/2018 | Doshi ............... H04L 41/145 |
| 2021/0306881 | A1* | 9/2021 | Ye ........................ H04L 41/16 |
| 2023/0362689 | A1* | 11/2023 | Cauduro Dias de Paiva ............ H04W 52/24 |

FOREIGN PATENT DOCUMENTS

| BR | 1201201955-8 A2 | 9/2013 | |
| KR | 20110093642 A * | 8/2011 | ............ H04W 76/27 |

\* cited by examiner

*Primary Examiner* — David Bilodeau
(74) *Attorney, Agent, or Firm* — CHRISTENSEN O'CONNOR JOHNSON KINDNESS PLLC

(57) ABSTRACT

The present disclosure generally relates to a method and a test system for establishing an over-the-air communication connection between a device under test and a mobile communication tester. A simulated network is provided by using the mobile communication tester. The device under test is activated and a search for the simulated network to connect to is initiated by the device under test. Configuration data of the simulated network are submitted to the device under test by using the mobile communication tester. A communication connection is established between the device under test and the simulated network based on the configuration data submitted.

19 Claims, 2 Drawing Sheets

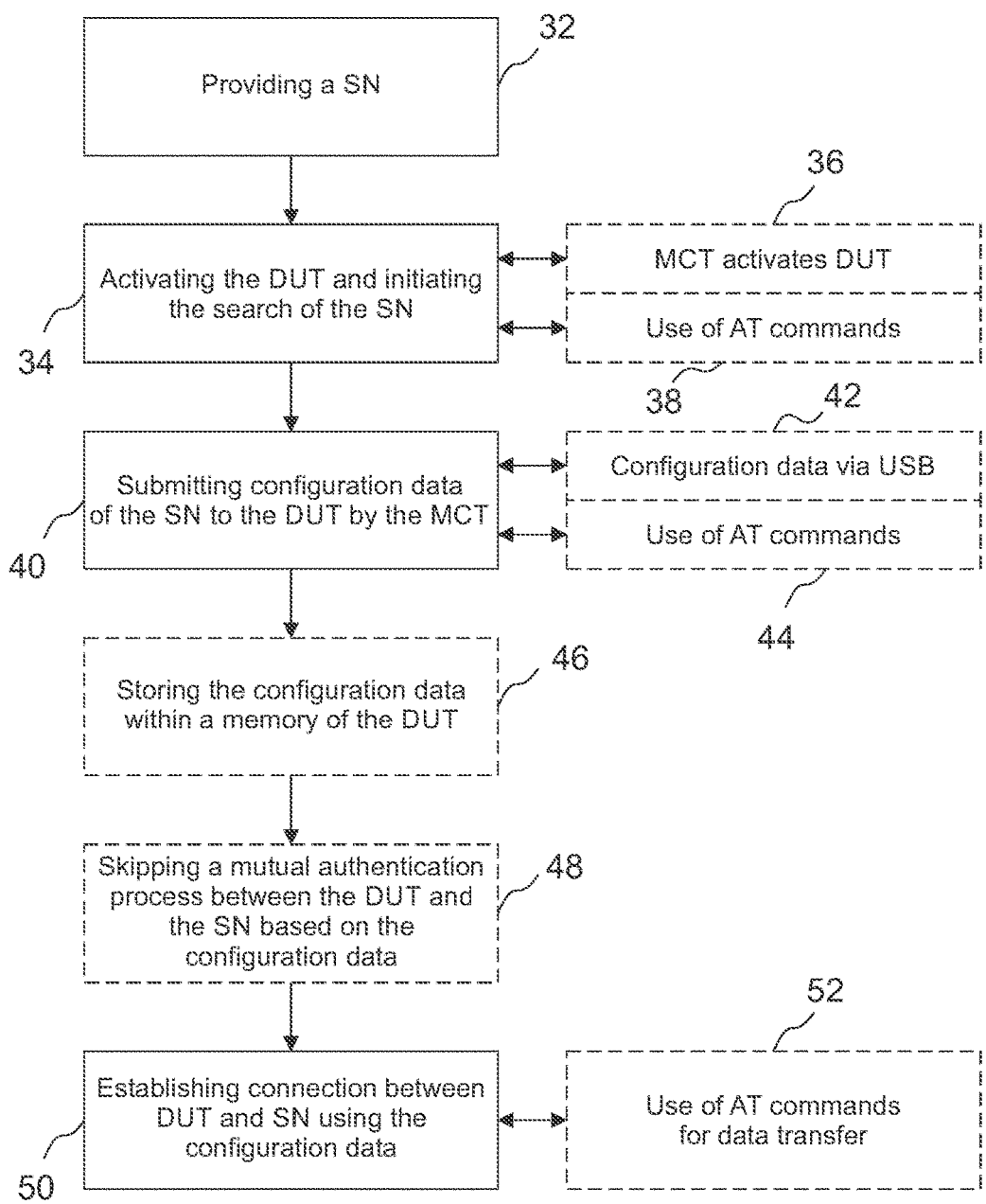

METHOD AND TEST SYSTEM FOR ESTABLISHING AN OVER-THE-AIR COMMUNICATION CONNECTION BETWEEN A DUT AND A MOBILE COMMUNICATION TESTER

FIELD OF THE DISCLOSURE

The present disclosure generally relates to a method and a test system for establishing an over-the-air communication connection between a device under test and a mobile communication tester.

BACKGROUND

If user equipment devices (UEs), such as mobile phones, are produced within a manufacturing facility, at least a random number of the produced UEs are tested in view of their communication functionalities. For example, a test engineer may run throughput tests or latency related tests.

For these tests, the UEs have to be connected to a test network, e.g. a simulated network, namely a network having certain properties and/or characteristics. In order to achieve a valid connection, a search of the test network is initiated after the UEs are powered on or turned ON. The registration procedure of a UE with the test network relies on the UE initiating all required connection functionalities and, subsequently, camping on the respective test network. During the camping procedure all available communication frequencies are blindly searched until a valid connection with the test network can be established, for example via a specific radio cell of the network. This procedure typically requires certain procedures to be conducted, such as an authentication procedure between the UE and the test network. As a consequence, the overall connection procedure lasts a camping time period of one or several minutes until a reliable connection is achieved. Typically, this procedure only takes place in case the UE is connected to a respective network for the first time. Thus, the duration is not an issue during regular operation of the UE, but for testing purposes, for example for testing a large number of UEs.

As the number of connections that can be established simultaneously by the test network is limited and since the camping time period causes a significant delay, only a limited number of UEs can be tested per time unit, such as per hour. As a consequence, the overall fraction of the produced UEs which are tested is limited as well. Hence, there is at least a chance for an unobserved error rate caused by non-tested UEs.

Accordingly, there is a need for a method and a test system which enable the time period for establishing a reliable communication connection between a UE and a test network to be shortened as compared to prior art approaches.

SUMMARY

A summary of certain embodiments disclosed herein is set forth below. It should be understood that these aspects are presented merely to provide a brief summary of these embodiments and that these aspects are not intended to limit the scope of this disclosure. This disclosure may encompass a variety of aspects that may not be set forth below. Some aspects as explained in view of methods, others in view of devices. However, the respective aspects are to be correspondingly transferred from methods to devices and vice versa.

Embodiments of the present disclosure relate to a method for establishing an over-the-air communication connection between a device under test (DUT) and a mobile communication tester (MCT). In an embodiment, the method comprises at least the following steps. A simulated network (SN), namely a test network, is provided by using the MCT. The DUT is activated. A search for the SN to connect to is initiated by the DUT. Configuration data of the SN are submitted to the DUT by using the MCT. A communication connection is established between the DUT and the SN based on the configuration data submitted.

The present disclosure is based on the fact that the specific configuration data of the SN required to establish a communication connection between the DUT and the SN do not have to be searched and identified by the DUT itself. Instead, the respective configuration data are directly provided to the DUT by the MCT. Based on the received configuration data, the communication connection between the DUT and the SN may be immediately established without a (blind) search being required.

Thus, time delays caused by the camping time period can be reduced. Therefore, the number of DUTs which can be tested per time unit by using the SN is enlarged as compared to prior art approaches. Hence, the risk of unobserved errors caused by non-tested DUTs is reduced. Accordingly, the reliability of the DUTs with regard to a desired functionality is improved.

Generally, the mobile communication tester may comprise several (separately formed) devices having their own housings, for instance a network device configured to establish the network connection and a data transmission device configured to submit the configuration data to the DUT. The mobile communication tester may also relate to a single device having a single housing that encompasses respective functionality modules, e.g. a network module configured to establish the network connection and a data transmission module configured to submit the configuration data to the DUT.

The network device or the network module may relate to a test and measurement equipment, a base station, an antenna and/or a transceiver. The data transmission device or the data transmission module may submit the configuration data which is used by the network device or the network module, e.g. the test and measurement equipment.

The simulated network is a test network that is used for testing the DUT. In some embodiments, the simulated network relates to a real-world network with simulated characteristics that correspond to a network to which the DUT is connected during regular operation. Put differently, the simulated network is a network having simulated characteristics.

Some embodiments of the present disclosure relate to a test system for establishing an over-the-air communication connection between a DUT and a SN provided by a MCT. The DUT is configured to initiate a search for the SN and to connect to the SN once the DUT is activated. The MCT is configured to submit configuration data of the SN to the DUT. The DUT is also configured to establish a communication connection with the SN by using the configuration data submitted.

The advantages obtained by the before-mentioned method are readily achieved by the test system as well. In some embodiments, the configuration data are directly provided to the DUT independent of a (blind) search procedure performed thereby. Accordingly, an unwanted time delay for establishing the communication connection between the DUT and the SN can be avoided.

Optionally, the DUT is configured to establish the communication connection with the SN within a rapid camping time period which is shorter than a standard camping time period required for establishing the communication connection with the SN without having received the configuration data. This can be achieved by submitting the configuration data to the DUT such that the DUT is aware of what to be searched for than performing a blind search. Therefore, a method is provided where the DUT is not required to blindly search all available frequencies of the SN to identify the respective configuration data required for establishing a communication connection with the SN, but to search for the simulated network in a directed manner due to the information obtained, namely the configuration data submitted previously. As a consequence, the time period that the DUT camps on the SN, can be drastically shortened as compared to prior art approaches. Where the camping time period according to the prior art lasts several minutes, the camping time period according to the present method can be reduced to a few seconds. Thus, the throughput in view of tested DUTs per time unit can be enlarged.

In some embodiments, the DUT is configured to establish the communication connection with the SN within a rapid camping time period which is shorter than a threshold time limit. Thus, a threshold time limit can be met such that the overall time period for testing a DUT is reduced.

According to some embodiments, a mutual authentication process between the DUT and the SN is skipped by actively submitting the configuration data of the SN to the DUT. In some embodiments, the test system is configured respectively such that the mutual authentication process can be skipped. The mutual authentication process requires several communication messages to be transmitted between the SN and the DUT. Thus, the authentication process at least partially causes the camping time period according to prior art approaches to not be reducible below certain minimum time periods. Since the configuration data are directly provided to the DUT by the MCT, the mutual authentication process can be avoided. Hence, the camping time period which is required for establishing a connection between the DUT and the SN can be reduced to even below the minimum time periods achieved by prior art approaches.

Optionally activating the DUT may relate to a powering up or a turning ON of the DUT. As a direct consequence of activating the DUT, the search for the SN may be (automatically) initiated, e.g. based on intrinsic protocols embedded with the DUT. Alternatively or additionally, the search for the SN may be (automatically) initiated once the configuration data is obtained by the DUT. This ensures that a directed search is performed from the beginning.

In some embodiments, the SN is a wireless test network according to a predefined communication standard, such as GSM (Global System for Mobile Communications), UTRAN (UMTS Terrestrial Radio Access Network), 5G, 5G NR (5G New Radio), LTE (Long Term Evolution), 6G, or the like. Therefore, the DUT can be tested in view of common and fundamental communication standards.

For establishing the SN, the underlying network infrastructure may comprise at least one antenna configured for establishing the communication with the DUT via at least one specific wireless communication standard.

In some embodiments, the DUT is configured to receive AT commands, such as AT+CFUN commands, in the following collectively named "AT commands". AT Commands are defined by specific rules, such as TS 27.007, agreed upon by the 3GPP (3rd Generation Partnership Project). Thus, commands may be used which are commonly applicable to a wide range of different types of DUTs. AT commands do not require sophisticated operating systems to be installed within the DUT. Rather, AT commands can already be recognized by the DUT based on intrinsic "native" firmware procedures. Hence, unwanted modification of the DUT for achieving the ability to interpret the AT commands can be avoided.

Optionally, the DUT is activated by using AT commands. Therefore, the range of applications in which the method as described herein can be applied to is enlarged.

According to some embodiments, the MCT provides the DUT with the configuration data by using AT commands. This means that also in view of receiving and applying the respective configuration data, the DUT is not required to be equipped with specialized operating systems. Therefore, the complexity for employing the method is kept low.

In some embodiments, the MCT is configured to activate the DUT and to initiate the search for the SN. This means that the required procedures, which are to be conducted by the DUT, can all be initiated by a single device, namely the MCT. The number of required separate devices for applying the method is kept low.

In some examples, the MCT is configured to store the configuration data within a memory of the DUT. Hence, the configuration data can be accessed multiple times if needed, also at a later point in time. Therefore, different test campaigns can be performed at different times without the necessity to submit the configuration data again.

The configuration data submitted may also comprise information about different simulated networks, e.g. test networks, used for different testing purposes. Accordingly, the information concerning all networks used during the testing is forwarded to the DUT. In some embodiments, the respective configuration data for the different simulated networks, e.g. test networks, is stored in the memory.

Optionally, AT commands are applied for a data transfer towards the DUT. Accordingly, also in view of the data transfer, no sophisticated operating systems need to be installed with the DUT. The complexity of the method can be kept low.

In some embodiments, the configuration data is transferred via a universal serial bus (USB) connection established with the DUT, preferably in view of the MCT. Accordingly, the DUT comprises at least one communication port according to the universal serial bus protocol. This means that the configuration data is provided through a wired connection while the connection between the DUT and the SN, e.g. the connection via the simulated network, is wireless. Advantageously, the wired connection via the universal serial bus can be handled by the DUT without requiring specific configuration data. Put differently, the configuration data can be received and processed without any specific configuration to be done previously. This also means that two separate communication mechanisms are applied with the DUT such that an influence between the different communication mechanisms can be prevented.

Generally, the configuration data may be transferred to the DUT by any other (wired) connection being separately formed with respect to the network connection to be established via the simulated network.

According to some embodiments, the DUT comprises at least one embedded universal integrated circuit card ((e)UICC). The (e)UICC is a smart card having an integrated circuit card used in mobile communication infrastructures, such as GSM and UMTS networks. The UICC may contain several applications relating to GSM, UMTS, or other communication standards, making it possible for the same smart card to give access to multiple network infrastructures employing different communication standards. Moreover, the (e)UICC provides storage of a DUT to be used such as for storing configuration data of the SN. In some embodiments, the (e)UICC has a rewritable profile that allows the respective data to be modified without physically replacing the card. Hence, different profiles of the configuration data can be provided to the DUT which enables the DUT to be tested with regard to a larger variety of communication functionalities, such as with regard to different communication standards.

In some embodiments, the DUT is restricted to connect to the SN based on the (e)UICC. Thus, connection to different network infrastructures can be prevented. The risk that an underlying testing procedure may be affected by a different connection is avoided.

According to some embodiments, the DUT is a mobile phone, a tablet or a device having a cellular communication module having circuitry configured to carry out its respective functions disclosed herein. The method as described herein can thus be applied to a wide variety of devices of different types.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 2 is a schematic drawing of a method for establishing an over-the-air communication connection between a DUT and a MCT according to an embodiment.

DETAILED DESCRIPTION

Figure 1:
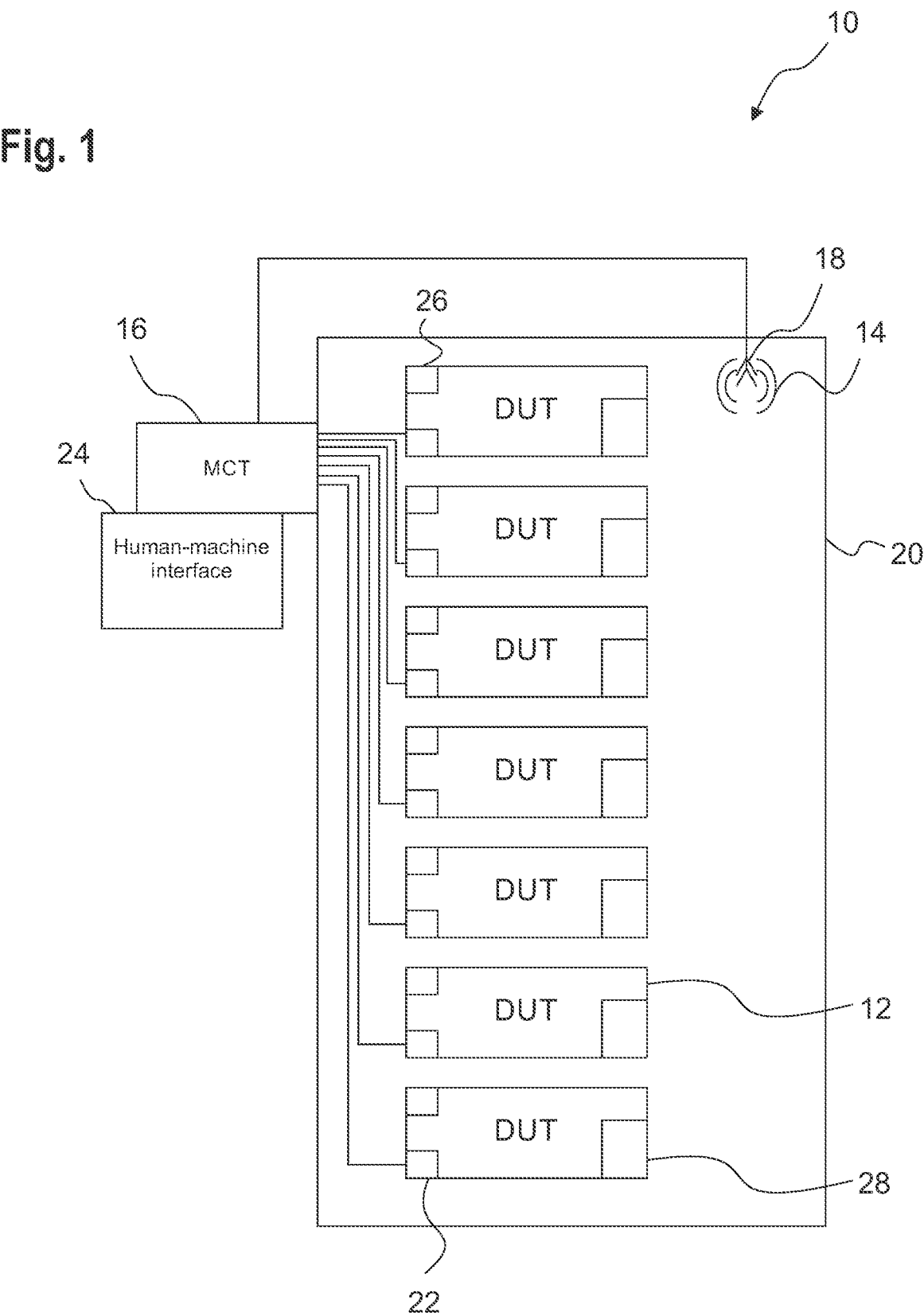
FIG. 1 is a schematic drawing of a test system for establishing an over-the-air communication connection between a DUT and a SN provided by a MCT according to an embodiment.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

FIG. 1 is a schematic drawing of a test system 10 for establishing an over-the-air (OTA) communication connection between a device under test (DUT) 12 and a simulated network (SN) 14 provided by a mobile communication tester (MCT) 16 according to an embodiment. As shown in the embodiment of FIG. 1, the DUT 12 is a mobile phone. The SN 14 is established according to a predetermined communication standard, such as GSM, UTRAN, 5G, 5G NR, LTE, or 6G. The MCT 16 is configured to establish the SN 14, e.g. by utilizing at least one antenna 18. In some examples, the SN 14 can be established within a demarcated area, such as a production facility 20.

Usually, within such a production facility 20 multiple DUTs 12 are provided which have been manufactured only recently and which, subsequently, are to be tested with regard to their communication functionalities. In this sense, the main goal of the test system 10 is to establish a wireless communication connection between each (or as many as possible) DUT 12 and the SN 14.

Each DUT 12 may comprise a communication port 22 configured to establish a connection according to the universal serial bus protocol. In some embodiments, the communication port 22 is configured for a wired communication connection.

In this regard, the MCT 16 is correspondingly configured to establish a communication connection with the DUTs 12 according to the universal serial bus protocol. Consequently, two independent communication connections may be established between the DUT 12 and the MCT 16, one of which is wireless while the other one, for example, is wired.

Optionally, the MCT 16 may be coupled to a human-machine interface 24 which is configured to output parameters relating to the connection configuration and to receive user inputs for modifying the configuration.

According to the example shown in FIG. 1, each DUT 12 comprises an (e)UICC 26. Based on the configuration data protocols within the respective (e)UICC 26 of the DUT 12 may be implemented or installed such that the DUT 12 is configured to immediately establish a communication connection with the SN 14. Moreover, according to this embodiment, based on the configuration data protocols provided or stored within the (e)UICC the DUT 12 is restricted to exclusively connect to the SN 14. This means that other wireless connections of the DUT 12 to different wireless network other than the SN 14 are prevented. Accordingly, the complexity of the testing procedure is reduced.

In addition, according to this example each DUT 12 comprises a memory 28 which can be used to store data, e.g. the configuration data received.

In the shown example, the MCT 16 is a single device having one housing that encompasses respective functionality modules, e.g. a network module having circuitry configured to establish the network connection and a data transmission module having circuitry configured to submit the configuration data to the DUT 12 as discussed later in more detail.

Alternatively, the MCT 16 comprises several (separately formed) devices having own housings, for instance a network device having circuitry configured to establish the network connection and a data transmission device having circuitry configured to submit the configuration data to the DUT 12. The separately formed device may however be connected with each other or communicate with each other such that information is exchanged. In some embodiments, the data transmission device obtains information about the configuration data to be used by the network device for establishing the SN 14. This enables the data transmission device to forward the configuration data to the DUT 12. This also applies to the respective modules in a similar manner.

The network device or the network module may comprise a test and measurement equipment, a base station, an antenna and/or a transceiver. The data transmission device or the data transmission module may submit the configuration data which is used by the network device or the network module, e.g. the test and measurement equipment.

FIG. 2 is a schematic representation of a method 30 for establishing an over-the-air communication connection between a DUT 12 and a MCT 16 according to an embodiment. Optional steps are shown in dashed lines.

According to step 32, the SN 14 is provided by the MCT 16, for example the network module or network device. For example, the antenna 18 may be used in this regard. In some embodiments, the MCT 16 may establish the SN 14 according to a predetermined communication standard.

In step 34, the DUT 12 is activated and a search for the SN 14 to connect to by the DUT 12 is initiated. Here, activation of the DUT 12 may refer to supplying power to the DUT 12 or to turning ON the DUT 12.

Step 34 can be modified by optional steps 36 and/or 38. Then, the DUT 12 is activated by the MCT 16 while also the search for the SN 14 is initiated by the MCT 16 (at least indirectly). In this regard, the MCT 16 may transmit respective commands to the DUT 12 such that the DUT 12 is activated and the search is initiated.

In an alternative embodiment, the initiation of the search for the SN 14 may also represent an intrinsic functionality of the DUT 12 which is automatically initiated once the DUT 12 is activated.

According to optional step 38, the commands provided by the MCT 16 to the DUT 12 in view of step 34 are transmitted using AT commands.

In step 40, configuration data of the SN 14 are submitted to the DUT 12 by using the MCT 16, for example the data transmission module or the data transmission device. This means that the DUT 12 is not required to finish a (blind) search for the SN 14 in order to identify appropriate configuration data. Step 40 can be altered by optional steps 42 and/or 44.

According to optional step 42, the configuration data is transmitted from the MCT 16 to the DUT 12 via a communication connection using the universal serial bus protocol, e.g. via the communication port 22 of the DUT 12, or another communication connection that is not based on the SN 14. Moreover, the configuration data may be provided to the DUT 12 using AT commands according to optional step 44.

Furthermore, the search for the SN 14 may be initiated by submitting the configuration data. Hence, the transmission of the configuration data may trigger the search. This is beneficial since the search can be done in a directed manner right from the beginning, as the search can be performed based on the configuration data of the SN 14.

Accordingly, the order of the steps "initiating the search of the SN 14" and "Submitting configuration data of the SN 14 to the DUT 12 by the MCT 16" may be altered.

The configuration data received by the DUT 12 may be stored within memory, such as the memory device 28, of the respective DUT 12 according to optional step 46. Then, the configuration data may also be used at a later point in time.

Furthermore, the method 30 may be modified by optional step 48 according to which a mutual authentication process between the DUT 12 and the SN 14 is skipped since the configuration data of the SN 14 are actively submitted to the DUT 12 by the MCT 16. In view of the knowledge of the configuration data, the mutual authentication process can be avoided.

The method 30 may also comprise step 50, according to which a communication connection is established between the DUT 12 and the SN 14 based on the configuration data submitted by the MCT 16 and received by the DUT 12. Put differently, the search initiated by the DUT 12 for identifying appropriate configuration data can be ended since the mutual authentication process between the DUT 12 and the SN 14 can be skipped in knowledge of the configuration data.

Therefore, the camping time required for identifying appropriate configuration data according to the prior art can be shortened according to the method 30. In essence, a rapid camping time period required for establishing the connection between the DUT 12 and the SN 14 is achieved which is well shorter than camping time periods that are required according to the prior art.

In some embodiments, the method 30 enables the rapid time period to stay below a predetermined threshold time limit that cannot be met by prior art approaches.

The method 30 may further be modified by optional step 52 according to which AT commands are used for a data transfer between the DUT 12 and the MCT 16 and/or a data transfer between the DUT 12 and the SN 14. Therefore, no specialized operating systems need to be installed for the DUT 12 being enabled to receive or transmit data. Although step 52 is shown in connection with step 50, step 52 may be applied in view of any data transfer between the DUT 12 and the MCT 16/SN 14.

In essence, by AT commands (AT+CFUN) the DUT 12 can be provided with corresponding configuration data for establishing a communication connection with the SN 14.

Certain embodiments disclosed herein include systems, apparatus, modules, components, etc., such as the DUT 12, the SN 14, the MCT 16, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances where the components are distributed, the components are accessible to each other via communication links.

In some embodiments, one or more of the components, such as the DUT 12, the SN 14, the MCT 16, etc., referenced above include circuitry programmed to carry out one or more steps of any of the methods disclosed herein. In some embodiments, one or more computer-readable media associated with or accessible by such circuitry contains computer readable instructions embodied thereon that, when executed by such circuitry, cause the component or circuitry to perform one or more steps of any of the methods disclosed herein.

In some embodiments, the computer readable instructions includes applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

In some embodiments, computer-readable media is any medium that stores computer readable instructions, or other information non-transitorily and is directly or indirectly accessible to a computing device, such as processor circuitry, etc., or other circuitry disclosed herein etc. In other words, a computer-readable medium is a non-transitory memory at which one or more computing devices can access instructions, codes, data, or other information. As a non-limiting example, a computer-readable medium may include a volatile random access memory (RAM), a persistent data store such as a hard disk drive or a solid-state drive, or a combination thereof. In some embodiments, memory can be integrated with a processor, separate from a processor, or external to a computing system.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein. All such combinations or sub-combinations of features are within the scope of the present disclosure.

Although the method and various embodiments thereof have been described as performing sequential steps, the claimed subject matter is not intended to be so limited. As nonlimiting examples, the described steps need not be performed in the described sequence and/or not all steps are required to perform the method. Moreover, embodiments are contemplated in which various steps are performed in parallel, in series, and/or a combination thereof. As such, one of ordinary skill will appreciate that such examples are within the scope of the claimed embodiments.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for establishing an over-the-air communication connection between a device under test and a mobile communication tester, wherein the method comprises at least the steps of:
   providing a simulated network by using the mobile communication tester,
   activating the device under test,
   initiating a search for the simulated network to connect to by the device under test, submitting configuration data of the simulated network to the device under test by using the mobile communication tester, and establishing a communication connection between the device under test and the simulated network based on the configuration data submitted.

2. The method according to claim 1, wherein the device under test is configured to establish the communication connection with the simulated network within a rapid camping time period which is shorter than a standard camping time period required for establishing the communication connection with the simulated network without having received the configuration data.

3. The method according to claim 1, wherein the device under test is configured to establish the communication connection with the simulated network within a rapid camping time period which is shorter than a threshold time limit.

4. The method according to claim 1, wherein a mutual authentication process between the device under test and the simulated network is skipped by actively submitting the configuration data of the simulated network to the device under test.

5. The method according to claim 1, wherein the device under test is activated by using attention commands.

6. The method according to claim 1, wherein the mobile communication tester provides the device under test with the configuration data by using attention commands.

7. The method according to claim 1, wherein the mobile communication tester includes circuitry configured to activate the device under test and to initiate the search for the simulated network.

8. The method according to claim 1, wherein the mobile communication tester includes circuitry configured to store the configuration data within a memory of the device under test.

9. The method according to claim 1, wherein attention commands are applied for a data transfer towards the device under test.

10. The method according to claim 1, wherein the configuration data is transferred via a universal serial bus connection established with the device under test.

11. A test system for establishing an over-the-air communication connection between a device under test and a simulated network provided by a mobile communication tester, wherein the device under test includes circuitry configured to initiate a search for the simulated network and to connect to the simulated network once the device under test is activated, wherein the mobile communication tester includes circuitry configured to submit configuration data of the simulated network to the device under test, an wherein the device under test also includes circuitry configured to establish a communication connection with the simulated network by using the configuration data submitted.

12. The test system according to claim 11, wherein the device under test includes circuitry configured to establish the communication connection with the simulated network within a rapid camping time period which is shorter than a standard camping time period required for establishing the communication connection with the simulated network without having received the configuration data.

13. The test system according to claim 11, wherein the test system is configured to skip a mutual authentication process between the device under test and the simulated network by actively submitting the configuration data of the simulated network to the device under test.

14. The test system according to claim 11, wherein the device under test is configured to receive data via attention commands.

15. The test system according to claim 11, wherein the device under test comprises at least one embedded universal integrated circuit card.

16. The test system according to claim 11, wherein the device under test is restricted to connect to the simulated network based on the embedded universal integrated circuit card.

17. The test system according to claim 11, wherein the device under test is a mobile phone, a tablet or a device having a cellular communication circuit.

18. The test system according to claim 11, wherein the device under test comprises a memory configured to store the configuration data.

19. The test system according to claim 11, wherein the device under test comprises at least one communication port according to the universal serial bus protocol, which is configured to establish a universal serial bus connection with the mobile communication tester.

* * * * *